United States Patent
Gray et al.

(10) Patent No.: US 7,290,174 B1
(45) Date of Patent: Oct. 30, 2007

(54) METHODS AND APPARATUS FOR GENERATING TEST INSTRUCTION SEQUENCES

(75) Inventors: Nigel Gray, High Wycombe (GB); Steven Perry, Wycombe (GB)

(73) Assignee: Altera Corporation, San Jose, CA (US)

(*) Notice: Subject to any disclaimer, the term of this patent is extended or adjusted under 35 U.S.C. 154(b) by 858 days.

(21) Appl. No.: 10/727,781

(22) Filed: Dec. 3, 2003

(51) Int. Cl.
*G06F 11/00* (2006.01)

(52) U.S. Cl. .......................................... 714/33; 703/26

(58) Field of Classification Search ................ 714/33; 703/26; 717/126
See application file for complete search history.

(56) References Cited

U.S. PATENT DOCUMENTS

| | | | | |
|---|---|---|---|---|
| 5,073,968 | A * | 12/1991 | Morrison | 703/26 |
| 5,132,972 | A * | 7/1992 | Hansen | 714/38 |
| 6,006,028 | A * | 12/1999 | Aharon et al. | 703/21 |
| 6,075,937 | A * | 6/2000 | Scalzi et al. | 703/23 |
| 6,081,885 | A * | 6/2000 | Deao et al. | 712/227 |
| 6,094,729 | A * | 7/2000 | Mann | 714/25 |
| 6,112,298 | A * | 8/2000 | Deao et al. | 712/227 |
| 6,647,513 | B1 * | 11/2003 | Hekmatpour | 714/37 |
| 6,871,298 | B1 * | 3/2005 | Cavanaugh et al. | 714/33 |
| 2003/0135844 | A1 * | 7/2003 | Yellin et al. | 717/126 |
| 2004/0268327 | A1 * | 12/2004 | Burger | 717/140 |
| 2005/0154550 | A1 * | 7/2005 | Singh et al. | 702/108 |
| 2006/0101369 | A1 * | 5/2006 | Wang et al. | 716/17 |
| 2006/0145896 | A1 * | 7/2006 | Venkatesan et al. | 341/50 |
| 2006/0259878 | A1 * | 11/2006 | Killian et al. | 716/1 |

OTHER PUBLICATIONS

Chandra et al "AVPGEN-A Test Generator for Architecture Verification" IEEE 1995.*
Corno et al "Automatic Test Program Generation: A Case Study" IEEE 2004.*
Tehranipour et al., "Embedded Test for Processor and Memory Cores in System-on-Chips", VLSI Circuits and Systems Laboratory, Dept of ECE, The University of Tehran, Sep. 2003.
Campenhout et al., "High-Level Test Generation for Design Verification of Pipelined Microprocessors", ACM 1-58113-109-7/99/06, 1999.

* cited by examiner

*Primary Examiner*—Bryce P Bonzo
(74) *Attorney, Agent, or Firm*—Beyer Weaver LLP

(57) ABSTRACT

Methods and apparatus are provided for automatically generating instruction sequences for verifying the operation of a processor, such as a central processing unit, a processor core, a graphics accelerator, or a digital signal processor. The instruction sequences can also be used to verify the operation of tools associated with implementing a processor. Test parameters are used to combine test fragments to generate test instructions. Check instructions are also provided to immediately identify faults encountered during operation.

30 Claims, 6 Drawing Sheets

Figure 2

| 200 | Operation Code 201 | Operand 203 | Operand 205 |
|---|---|---|---|
| 210 | Operation Code 211 | Operand 213 | Operand 215 |

| | | | | |
|---|---|---|---|---|
| 220 | Operation Code 221 | Operand 223 | Operand 225 | Operand 227 |
| 230 | Operation Code 231 | Operand 233 | Operand 235 | |
| 240 | Branch 241 | Error Handler 243 | | |

| 250 | Operation Code 251 | Operand 253 | Operand 255 |
|---|---|---|---|
| 260 | Operation Code 261 | Operand 263 | Operand 265 |

| | | | | |
|---|---|---|---|---|
| 270 | Operation Code 271 | Operand 273 | Operand 275 | Operand 277 |
| 280 | Operation Code 281 | Operand 283 | Operand 285 | |
| 290 | Branch 291 | Error Handler 293 | | |

Figure 3

| 300 | Operation Code 301 | Operand 303 | Operand 305 | Expctd OpCode 307 |
|---|---|---|---|---|
| 310 | Operation Code 311 | Operand 313 | Operand 315 | Expctd OpCode 317 |

| 350 | Operation Code 351 | Operand 353 | Operand 355 | Expctd OpCode 357 |
|---|---|---|---|---|
| 360 | Operation Code 361 | Operand 363 | Operand 365 | Expctd OpCode 367 |

| 320 | Operation Code 321 | Operand 323 | Operand 325 | Operand 327 | Expctd OpCode 329 |
|---|---|---|---|---|---|
| 330 | Operation Code 331 | Operand 333 | Operand 335 | Expctd OpCode 337 | |
| 340 | Branch 341 | Error Handler 343 | Expctd OpCode 345 | | |

METHODS AND APPARATUS FOR GENERATING TEST INSTRUCTION SEQUENCES

BACKGROUND OF THE INVENTION

1. Field of the Invention

The present invention relates to generating instructions. In one example, the present invention relates to methods and apparatus for automatically generating test instructions to verify the operation of a processor.

2. Description of the Prior Art

The increasing complexity and variety of processors has led to the increased difficulty in thoroughly verifying and evaluating the performance of these disparate devices. Processors such as central processing units (CPUs), processor cores, graphics accelerators, and digital signal processors (DSPs) support diverse instruction sets and have elements for implementing the instruction sets. In some instances, certain processors also support customized instruction sets. A variety of tools such as instruction set simulators and hardware simulators also use the instruction sets and customized instruction sets.

However, the mechanisms for testing processors and processor associated tools are limited. In typical examples, limited sets of instruction sequences are provided to a processor or a processor associated tool. The limited sets of instruction sequences may not be sufficiently diverse to comprehensively test a processor or a processor associated tool.

Consequently, it is therefore desirable to provide improved methods and apparatus for comprehensively testing processors and associated tools. More specifically, it is desirable to provide improved techniques and mechanisms for automatically generating selected test sequences that allow directed as well as comprehensive testing of processors and associated tools.

SUMMARY OF THE INVENTION

Methods and apparatus are provided for automatically generating instruction sequences for verifying the operation of a processor, such as a central processing unit, a processor core, a graphics accelerator, or a digital signal processor. The instruction sequences can also be used to verify the operation of tools associated with implementing a processor. Test parameters are used to combine test fragments to generate test instructions. Check instructions are also provided to immediately identify faults encountered during operation.

In one embodiment, a computerized method for generating test instruction sequences is provided. A plurality of operation codes are identified. The plurality of operation codes are included in an instruction set supported by a processor. A plurality of registers are identified. The plurality of registers are associated with the processor. A plurality of test instructions are generated. The test instructions are generated by combining fragments associated with the plurality of operation codes and registers. A plurality of check instructions are generated. The check instructions are configured to determine if the test instructions are run correctly.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media. Still other aspects relate to systems including a processor and memory for implementing a method as described above. Any of the methods or techniques of this invention may be implemented on a system having a processor and memory.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIG. 2 is a diagrammatic representation showing generated test sequences for testing a processor or tools associated with a processor.

FIG. 3 is a diagrammatic representation showing generated test sequences for testing an assembler.

DETAILED DESCRIPTION OF SPECIFIC EMBODIMENTS

Figure 1:
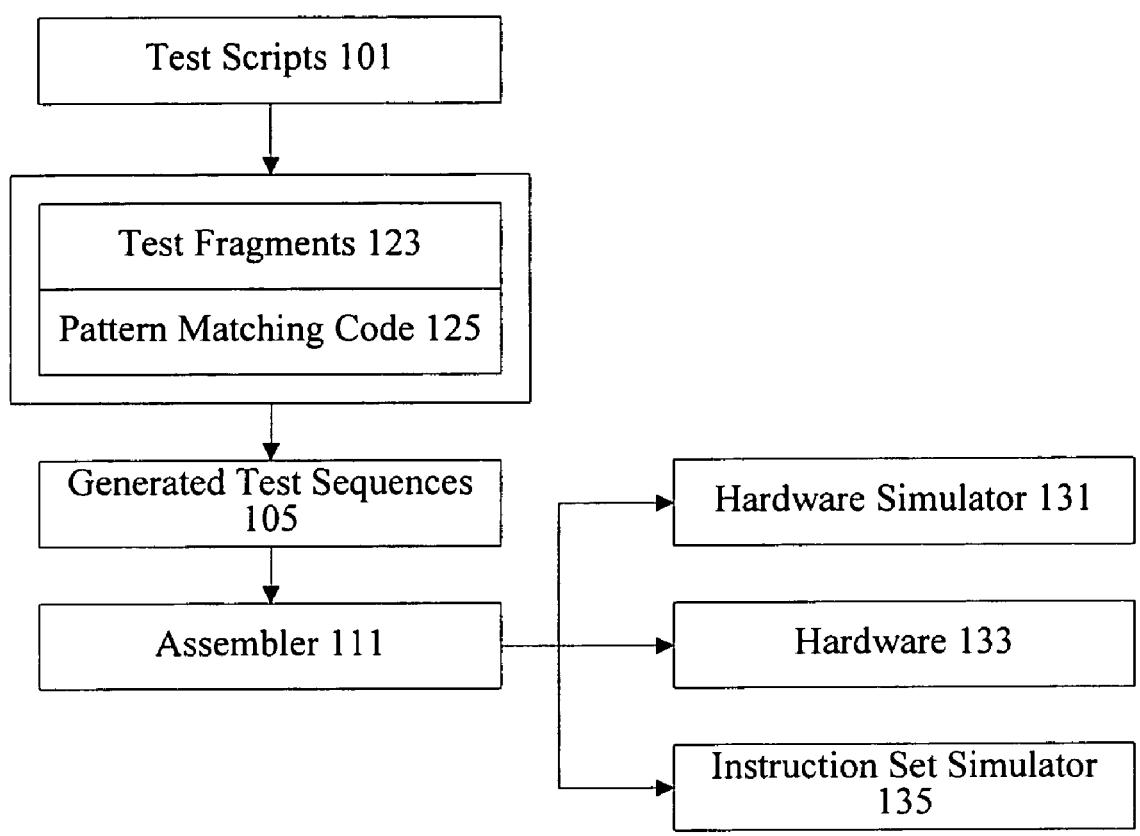
FIG. 1 is a diagrammatic representation showing generation of test instruction sequences.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processors including tools for implementing processors.

However, it should be noted that the techniques of the present invention can be applied to a variety of processors and tools associated with implementing processors. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Conventional processors are used in a variety of different systems. Processors include central processing units, digital signal processors, graphics accelerators, processor cores, etc. Any logic, mechanism, or device that supports an instruction set is referred to herein as a processor. In some examples, a processor can support a complex instruction set computing (CISC) instruction set while another examples of processor can support a reduced instruction set computing (RISC) instruction set. A variety of other instruction sets can also be used. In order to test a particular processor or tools associated with implementing the processor, instruction sequences are prepared. In one example, hundreds of instructions are provided for each processor or processor tool. The hundreds of instructions prepared include a variety of supported instructions using registers associated with the processor. For example, if a new instruction is being added to a particular processor, hundreds of sequences are prepared so that the new instruction sequences can be tested. Providing the numerous sequences of test instructions often requires a designer to think through the various instruction sequences that a processor would typically handle. For example, instruction sequences may include adding the values of two registers and comparing a sum to a third value.

However, processors are typically not thoroughly evaluated using this approach. Keeping track of what has been tested and what has not been tested may also be monumental task. Very detailed planning often has to be conducted with consideration provided to all the various possible scenarios that a processor should be able to handle. Although testing of a processor can be conducted in this manner, there are some possible alternative mechanisms for testing processors. In one example, randomized inputs can be provided to a processor. However, randomized inputs may not accurately reflect realistic or consistent instruction sequences that a processor typically should be able to handle.

Furthermore, particular types of sequences that may infrequently cause errors may be missed because the test sequences provided are not sufficiently comprehensive. Any set of instructions used to verify the operation of a processor or associated tool used to implement the processor is referred to herein as test instructions or test sequences. Typical implementations also commonly fail to detect errors even as they occur. For example, test sequences may be provided to a processor and the processor may output seemingly correct data even though a particular operation is inaccurate.

Consequently, techniques of the present invention provide mechanisms for generating test sequences for a variety of different processors. The test sequences can be a comprehensive set evaluating the performance of a number of instructions used by the processor. Alternatively, the test sequences can be a subset of a comprehensive set evaluating a portion of the instructions and registers used by the processor. In still another example, the test sequences may be an extensive set of randomized instructions. The sequences can be customized based on user inputs such as user scripts indicating what instructions or what registers the test sequences should verify. In one example, a script can be used to restrict the subset of instructions and registers used to generate instructions in a random sequence.

According to various embodiments, the test sequences generated include self checking sequences that allow instruction sequences to self check for errors. For example, a self checking sequences may compare a computed value to an expected value. If the computed value and the expected value do not match, instruction sequences may branch to an error handler to allow immediate detection of any processor faults. The generated test sequences can also be checked for inconsistencies. Invalid instructions will not be generated. For example, checking for conflicting bit patterns is supported to prevent two script commands attempting to set the same bit to zero and one of the same time. Any tool used to automatically generate test instructions is referred to herein as a test sequence generation tool.

The test sequences generated according to various embodiments of the present invention are effective in testing a variety of different processors such digital signal processors, processor cores, central processing units, etc. In one example, a processor is implemented in hard logic and a processor core is implemented on a programmable chip. Mechanisms are also provided to allow the test sequences the to be used to evaluate tools associated with a processor. For example, the test sequence generation tool can be used to generate test sequences to verify the operation of an assembler, a hardware simulator, or an instruction set simulator. For example, added information can be provided with each instruction to allow an assembler to assemble an instruction and check that the encoding bit patterns generated by assembling the instruction match those provided by the added information. This allows for a very robust test of the assembler, even before the remainder of the processor associated tools are implemented.

FIG. 1 is a diagrammatic representation showing mechanisms used for generating test sequences. According to various embodiments, test scripts 101 are provided as user inputs. The test scripts can be used to control the types of test sequences that are generated. For example, test scripts may indicate what subset of instructions should be tested with emphasis. Although test scripts are one way of providing user input, it will be recognized that a variety of other ways of providing user input are also contemplated. In some examples, no user input is necessary and a complete comprehensive test set or a randomized test set is generated.

In other examples, a database may be accessed for particular information on the type of test sequences to generate, or a user interface may prompt a user for information. The test sequence generation tool identifies test fragments 123 associated with various instructions and registers. According to various embodiments, test fragments are binary representations of various instructions supported by a processor. Various fragments are arranged in different combinations to generate test sequences.

According to various embodiments, test instructions are built using the format shown as follows:

logicRand / rC / "," / rA / "," / rB

Pattern matching can be used to find any fragments or binary representations having the names given. For example, logicRand will match to "logicRand*", generating the logical AND function using all combinations of register inputs matching rC, rA, and rB. The fragments are then replaced by text using pattern matching code 125 to provide test sequences 105. According to various embodiments the test sequences are provided in text format has instruction sequences.

Although test sequences can be generated by combining text representation operation codes and registers in a variety of different manners, the techniques of the present invention recognize a variety of benefits in using binary representations for generating test sequences. In one example, by having the binary representation available, the binary representation can be provided as an expected operation code to be generated by an assembler when assembling the text instruction into its binary representation. The test sequences 105 can then be assembled by assembler 111 and used to test the actual hardware 133, hardware simulator 131, or an instruction set simulator 135.

FIG. 2 is a diagrammatic representation showing test instruction sequences that can be generated by a test instruction generation tool. According to various embodiments, generated test instruction 200 includes an operation code 201, and operands 203 and 205. Test instruction 210 includes operation code 211, and operands 213 and 215. Any instructions supported in the instruction set of a processor and used to verify the functionality of the processor is referred to herein as a test instruction.

According to various embodiments, test instructions are provided along with check instructions. The check instruction 220 includes an operation code 221, and operands 223, 225, and 227. Another check instructions 230 includes an operation code 231 and operands 233 and 235. Check instruction 240 includes a branch instruction 241 to an error handler 243. According to various embodiments, check instructions are provided along with test instructions so that processor functionality can be verified automatically. Check instructions are also instructions typically included in the instruction set a processor. However, check instructions typically include an error handling code sequence with mechanisms to allow information about any processor error to be obtained.

In one example, test instructions may involve placing particular fixed values into registers. For example, the value of 22 may be moving to register to a value of 33 may be moved into register 3. The check instructions would then add register 2 to register 3 and compare the value with an expected value 55. If the result does not match the expected value, there is a branch to an error handler. By using check instructions interspersed with test instructions, errors can be determined while particular test instruction sequences are run. These errors can be handled immediately upon detection.

If no error is detected, test instructions 250 in 260 can then be run. Test instructions 250 in 260 are associated with operation codes 251 and 261 and operands 253, 263, 255, and 265. After test instructions 250 in 260 are run, check instructions 270, 280, and 290 can be run to verify that the test instructions 250 and 260 were run properly. Check instructions 270, 280, and 290 are associated with operation codes 271 and 281 as well as operands 273, 275, 277, 283, and 285. A branch 291 to an error handler 293 is also included. Any instructions or sequence of instructions used to verify the functionality of test instructions is referred to herein as a check instruction. Check instructions typically include a branch to an error handling mechanism.

FIG. 3 is a diagrammatic representation showing another technique for verifying the functionality of processor. According to various embodiments, instead of interspersed check instructions between blocks of test instructions, check instructions are performed as a check at the end of a test sequence. In this manner, fewer check instructions are needed as merely final results can be verified. For example, test instructions 300, 310, 350, and 360 associated with operation codes 301, 311, 351, and 361 are provided. A long sequence of test instructions can be run before check instructions are run at the end of the sequence. Check instructions 320, 330, and 340 can similarly include operation codes, operands, and a branch to an error handler.

The instruction sequences generated as shown in FIG. 2 and FIG. 3 are effective for verifying the functionality of a particular processor. In one instance, check instructions are interspersed with test instructions to immediately detect processor errors. In another instance, check instructions are provided at the end of a series of test instructions to verify the accuracy of the end results. According to various embodiments, techniques of the present invention contemplate further added mechanisms to allow testing of tools and applications associated with implementing a processor.

For example, an assembler associated with implementing a processor core on a programmable chip may also be tested using the techniques of the present invention. In some examples, an assembler has to be checked to determine that operation codes are processed correctly. Consequently, the techniques of the present invention provide expected operation code fields added to the end of test instructions and check instructions. In FIG. 3, expected operation codes are shown as 307, 317, 357, 367, 329, 337, and 345. Expected operation codes allow verification that an assembler has assembled the instruction properly. For example, if an operation code indicates that a value should be moved into a particular register, the expected operation code can be a binary representation including the move operation code. After assembly, the assembled instruction can be compared with the expected operation code.

The following are instructions with expected operation codes shown in hexadecimal format for convenience:
cmpeq ra, ra, ra, 0xffff003a
cmpeq ra, ra, ba, 0xffbf003a
cmpeq ra, ra, ea, 0xff7f003a Although a variety of instructions in particular instruction sets can be used, the techniques of the present invention contemplate also generating customized instructions supported by particular processors, such as parameterizable processor cores. Customized instructions can in some instances be specified by a user in an input script, or may be part of a library accessed by a test instruction generator.

Figure 4:
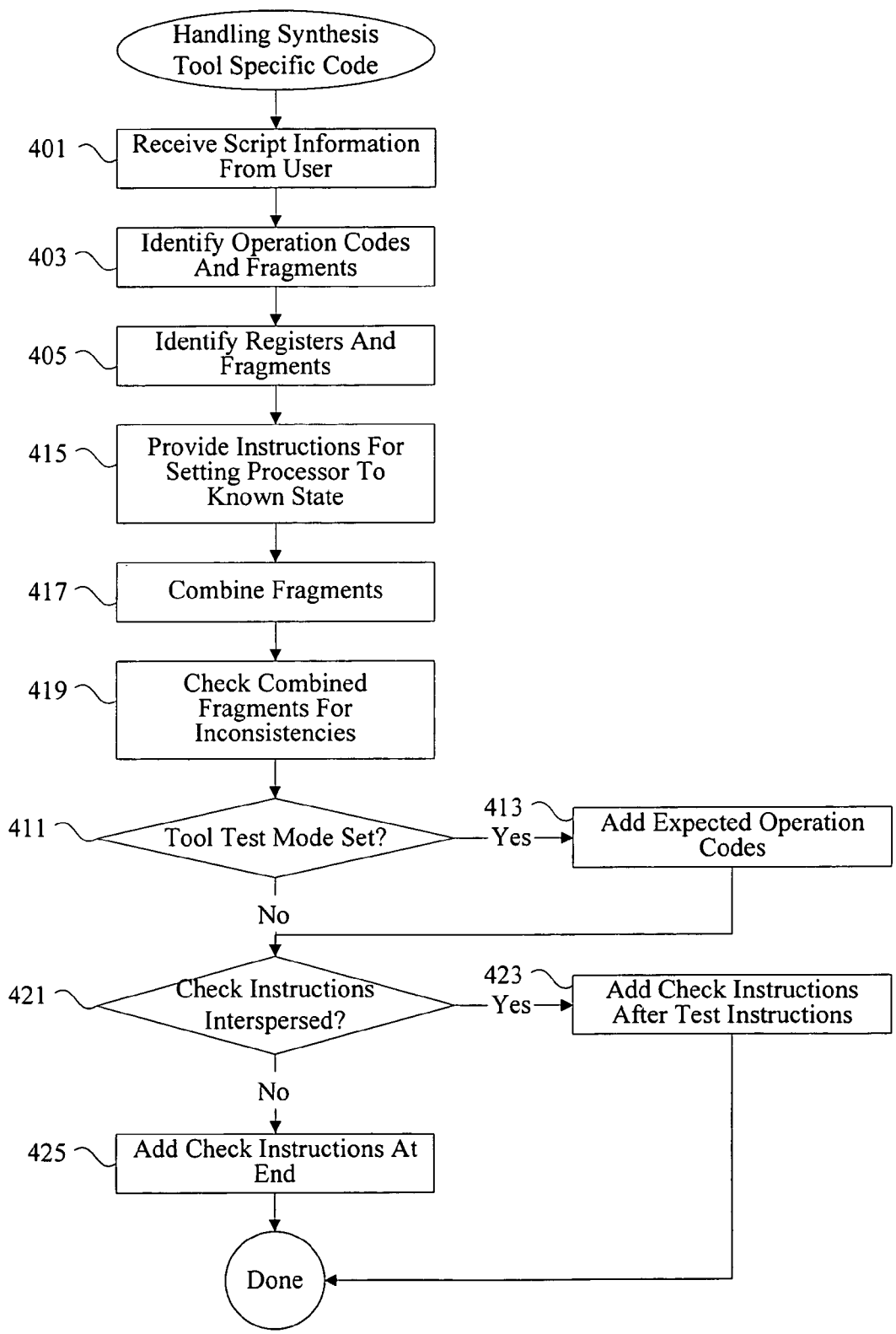
FIG. 4 is a process flow diagram showing a technique for generating test sequences.

FIG. 4 is a flow process diagram showing techniques for generating test sequences. At 401, script information is received from a user. According to various embodiments, script information may specify what set of instructions and what set of registers associated with a processor should be tested. In some instances, the information may be received from a database or a default set of parameters may be used. At 403, operation codes and their associated fragments are identified. In some examples, the fragments are binary representations of the operation codes. At 405, register values are identified. In some instances the register values have fragments associated with binary representations. At 415, instructions are provided in order to set a processor to a known state.

In some examples, setting a processor to a known state may involve initializing the registers to predetermined values. Instructions for setting a processor to a known state may be preprogrammed or dynamically generated. At 417, various fragments associated with operation codes and register values are combined. In one example, all possible combinations are produced and a random subset is selected for use in testing. In other examples, a subset of a comprehensive set of combinations is generated by combining bit fragments at 417. At 419, the combining bit fragments are checked for inconsistencies. In some examples, the combined bit fragments are primarily checked to ensure that no conflicts arise, such as conflicts resulting when the script commands causes the tool to try to generate an instruction bit pattern which set one instruction bit to 0 and 1 at the same time. In one example, checking for conflicts and invalid instructions can occur by recursing down the test sequence while performing rule checking for any conflicts. If a conflict is found, no test case will be generated.

At 411, the test load can be identified. In some examples, if test sequences are generated for testing a particular processor, no expected operation codes need to be added at 411. By contrast, if the assembler test is set, and test sequences are being generated to verify functionality of an assembler, expected operation codes are added at 413. At 421, it is determined if generated test instructions should have interspersed check instructions. That is, it is determined if check instructions should be interspersed with test instructions or check instruction should be merely added to the end of a long series of test instructions. If sequential checking is selected at 421, check instructions are added after small blocks of test instructions at 423. If sequential checking is not selected, check instructions are added at the end of a long series of test instructions at 425.

Figure 5:
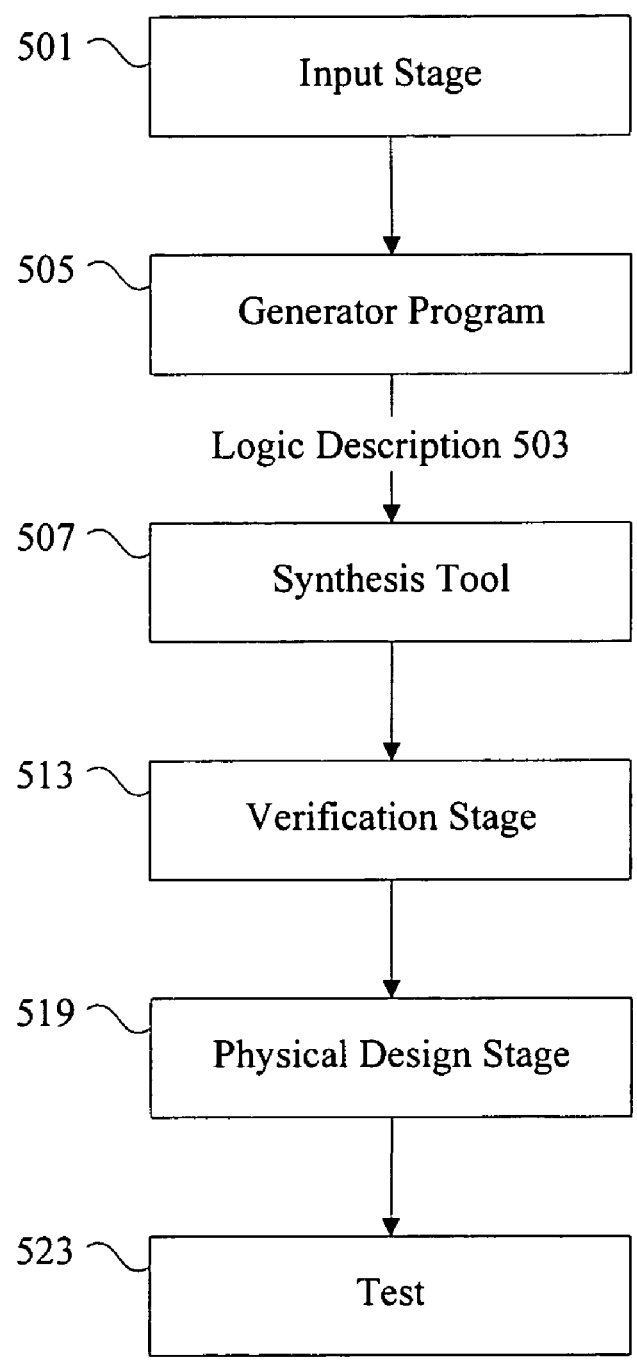
FIG. 5 is a diagrammatic representation showing context for use of the test sequence generation tool.

The techniques of the present invention can be applicable to generating test instruction sequences for a variety of different processors and tools. FIG. 5 is a diagrammatic representation showing one context involving processor cores and programmable chips. The techniques of the present invention can be used to generate test instructions for verifying the operation of the processor core along with operation of tools used to implement the processor core and the programmable chip. It should be noted that the test sequence generation tool of the present invention is not limited to processor cores and programmable chips.

FIG. 5 is a diagrammatic representation showing implementation of an electronic device having a processor core that can be tested using the mechanisms of the present invention. An input stage 501 receives selection information typically from a user for logic such as a processor core as well as other components to be implemented on an electronic device. A generator program 505 creates a logic description and provides the logic description along with other customized logic to any of a variety of synthesis tools, place and route programs, and logic configuration tools to allow a logic description to be implemented on an electronic device.

In one example, an input stage 501 often allows selection and parameterization of components to be used on an electronic device. In some examples, components provided to an input stage include intellectual property functions, megafunctions, and intellectual property cores. The input stage 501 may be a graphical user interface using wizards for allowing efficient or convenient entry of information. The input stage may also be a text interface or a program reading a data file such as a spreadsheet, database table, or schematic to acquire selection information. The input stage 501 produces an output containing information about the various modules selected.

In typical implementations, the generator program 505 can identify the selections and generate a logic description with information for implementing the various modules. The generator program 505 can be a Perl script creating HDL files such as Verilog, Abel, VHDL, and AHDL files from the module information entered by a user. According to various embodiments, the generator program 505 also provides information to a synthesis tool 507 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 509.

As will be appreciated by one of skill in the art, the input stage 501, generator program 505, and synthesis tool 507 can be separate programs. The interface between the separate programs can be a database file, a log, or simply messages transmitted between the programs. For example, instead of writing a file to storage, the input stage 501 can send messages directly to the generator program 505 to allow the generator program to create a logic description. Similarly, the generator program can provide information directly to the synthesis tool instead of writing HDL files. Similarly, input stage 501, generator program 505, and synthesis tool 507 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 507.

A synthesis tool 507 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 513 typically follows the synthesis stage 507. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. In one example, simulation tools can be tested using the automatically generated test sequences of the present invention. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 513, the synthesized netlist file can be provided to physical design tools 519 including place and route and configuration tools. A place and route tool typically locates logic cells on specific logic elements of a target hardware device and connects wires between the inputs and outputs of the various logic elements in accordance with logic required to implement an electronic design. The device can also be physically tested at 523.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 501, the generator program 505, the synthesis tool 507, the verification tools 513, and physical design tools 519 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 6:
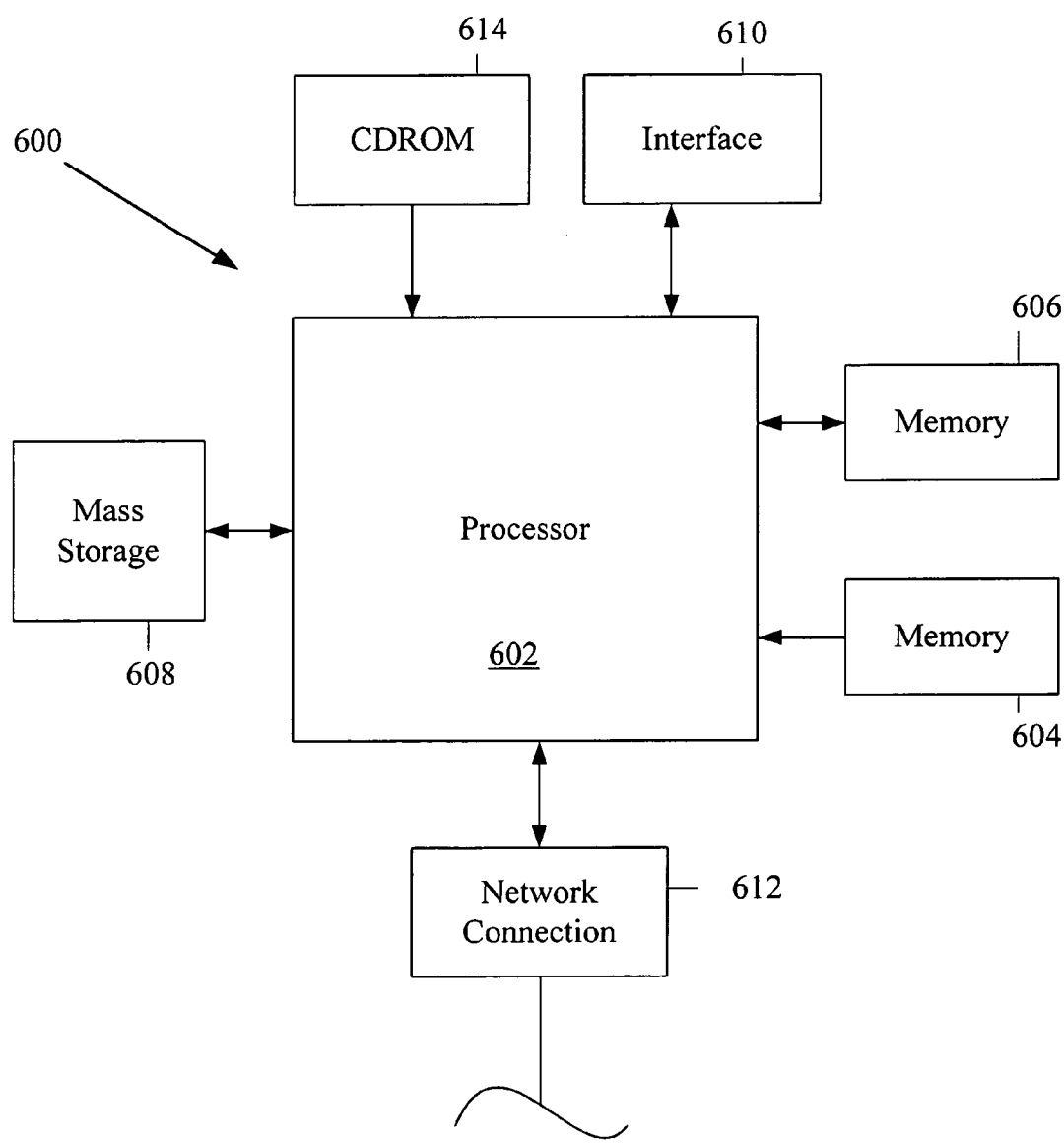
FIG. 6 is a diagrammatic representation of a computer system that can be used to generate test sequences.

FIG. 6 illustrates a typical computer system that can be used to generate test instructions. The computer system 600 includes any number of processors 602 (also referred to as central processing units, or CPUs) that are coupled to devices including memory 606 (typically a random access memory, or "RAM"), memory 604 (typically a read only memory, or "ROM"). The processors 602 can be configured to generate a test sequences for any designated processor. As is well known in the art, memory 604 acts to transfer data and instructions uni-directionally to the CPU and memory 606 is used typically to transfer data and instructions in a bi-directional manner.

Both of these memory devices may include any suitable type of the computer-readable media described above. A mass storage device 608 is also coupled bi-directionally to CPU 602 and provides additional data storage capacity and may include any of the computer-readable media described above. The mass storage device 608 may be used to store programs, data and the like and is typically a secondary storage medium such as a hard disk that is slower than memory. The mass storage device 608 can be used to hold a library or database of prepackaged logic or intellectual property functions, as well as information on generating particular configurations. It will be appreciated that the information retained within the mass storage device 608, may, in appropriate cases, be incorporated in standard fashion as part of memory 606 as virtual memory. A specific mass storage device such as a CD-ROM 614 may also pass data uni-directionally to the CPU.

CPU 602 is also coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to a computer or telecommunications network using a network connection as shown generally at 612. With such a network connection, it is contemplated that the CPU might receive information from the network, or might output information to the network in the course of performing the above-described method steps. It should be noted that the system 600 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 608 or 614 and executed on CPU 608 in conjunction with primary memory 606.

Although many of the components and processes are described above in the singular for convenience, it will be appreciated by one of skill in the art that multiple components and repeated processes can also be used to practice the techniques of the present invention.

What is claimed is:

1. A computerized method for generating test instruction sequences, the method comprising:
    identifying a plurality of operation codes, the plurality of operation codes included in an instruction set supported by a processor;
    identifying a plurality of registers, the plurality of registers associated with the processor;
    generating a plurality of test instructions, the test instructions generated by combining fragments associated with the plurality of operation codes and registers; and
    generating a plurality of check instructions, the check instructions configured to determine if the test instructions are run correctly.

2. The computerized method of claim 1, wherein the plurality of test instructions and check instructions are used to test a processor core associated with a programmable chip.

3. The computerized method of claim 2, wherein ones of the plurality of test instructions and check instructions generated to test the assembler include operation codes, operands, and expected operation codes.

4. The computerized method of claim 3, wherein the expected operation codes identify the operation the assembler should perform.

5. The computerized method of claim 1, wherein the plurality of test instructions and check instructions are used to test a processor core associated with a central processing unit.

6. The computerized method of claim 1, wherein the plurality of test instructions and check instructions are used to test a processor core associated with a digital signal processor.

7. The computerized method of claim 1, wherein ones of the plurality of test instructions and check instructions generated to test the assembler include operation codes, and operands.

8. The computerized method of claim 1, wherein the plurality of test instructions and check instructions are used to test an assembler.

9. The computerized method of claim 1, further comprising identifying configuration information for limiting the set of generated test instructions.

10. The computerized method of claim 9, wherein configuration is provided by a user to narrow generated test instructions to particular operations or registers.

11. The computerized method of claim 1, wherein the plurality of test instructions and check instructions are generated by identifying associated bit fragments.

12. A system for generating test instruction sequences, the system comprising:
    means for identifying a plurality of operation codes, the plurality of operation codes included in an instruction set supported by a processor;
    means for identifying a plurality of registers, the plurality of registers associated with the processor;
    means for generating a plurality of test instructions, the test instructions generated by combining fragments associated with the plurality of operation codes and registers; and
    means for generating a plurality of check instructions, the check instructions configured to determine if the test instructions are run correctly.

13. The system of claim 12, wherein the plurality of test instructions and check instructions are used to test a processor core associated with a programmable chip.

14. The system of claim 13, wherein ones of the plurality of test instructions and check instructions generated to test the assembler include operation codes, operands, and expected operation codes.

15. The system of claim 14, wherein the expected operation codes identify the operation the assembler should perform.

16. The system of claim 12, wherein the plurality of test instructions and check instructions are used to test a processor core associated with a central processing unit.

17. The system of claim 12, wherein ones of the plurality of test instructions and check instructions generated to test the assembler include operation codes, and operands.

18. The system of claim 12, wherein the plurality of test instructions and check instructions are used to test an assembler.

19. The system of claim 12, further comprising identifying configuration information for limiting the set of generated test instructions.

20. The system of claim 19, wherein configuration is provided by a user to narrow generated test instructions to particular operations or registers.

21. The system of claim 12, wherein the plurality of test instructions and check instructions are generated by identifying associated bit fragments.

22. A computer readable medium comprising computer code for generating test instruction sequences, the computer readable medium comprising:
   computer code for identifying a plurality of operation codes, the plurality of operation codes included in an instruction set supported by a processor;
   computer code for identifying a plurality of registers, the plurality of registers associated with the processor;
   computer code for generating a plurality of test instructions, the test instructions generated by combining fragments associated with the plurality of operation codes and registers; and
   computer code for generating a plurality of check instructions, the check instructions configured to determine if the test instructions are run correctly.

23. The computer readable medium of claim 22, wherein the plurality of test instructions and check instructions are used to test a processor core associated with a programmable chip.

24. The computer readable medium of claim 23, wherein ones of the plurality of test instructions and check instructions generated to test the assembler include operation codes, operands, and expected operation codes.

25. The computer readable medium of claim 24, wherein the expected operation codes identify the operation the assembler should perform.

26. The computer readable medium of claim 22, wherein ones of the plurality of test instructions and check instructions generated to test the assembler include operation codes, and operands.

27. The computer readable medium of claim 22, wherein the plurality of test instructions and check instructions are used to test an assembler.

28. The computer readable medium of claim 22, further comprising identifying configuration information for limiting the set of generated test instructions.

29. The computer readable medium of claim 28, wherein configuration is provided by a user to narrow generated test instructions to particular operations or registers.

30. The computer readable medium of claim 22, wherein the plurality of test instructions and check instructions are generated by identifying associated bit fragments.

* * * * *